(No Model.) 5 Sheets—Sheet 1.
C. G. P. DE LAVAL.
DEVICE FOR SUSPENDING MECHANICAL MILKING APPARATUS UPON COWS.
No. 544,813. Patented Aug. 20, 1895.
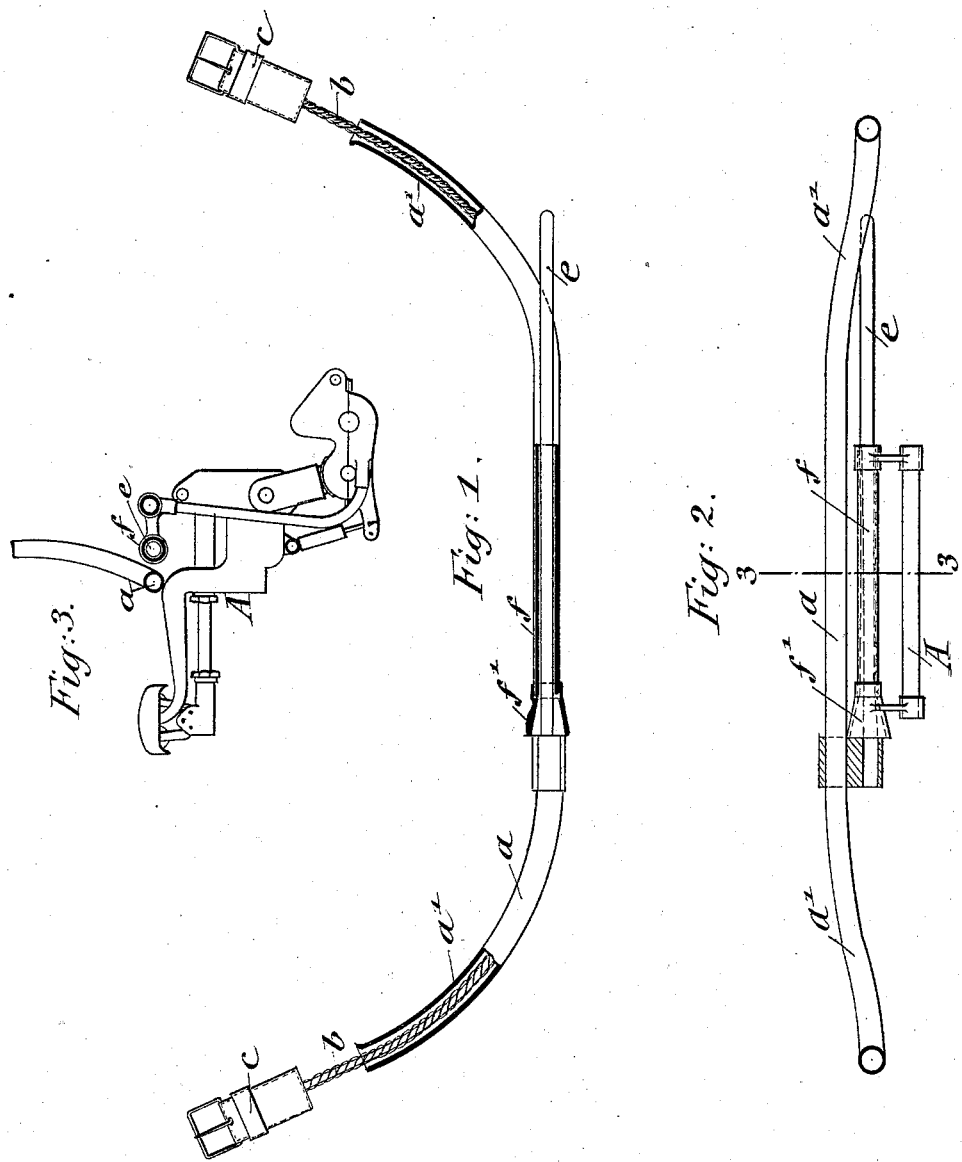

(No Model.)   5 Sheets—Sheet 2.
C. G. P. DE LAVAL.
DEVICE FOR SUSPENDING MECHANICAL MILKING APPARATUS UPON COWS.
No. 544,813.   Patented Aug. 20, 1895.
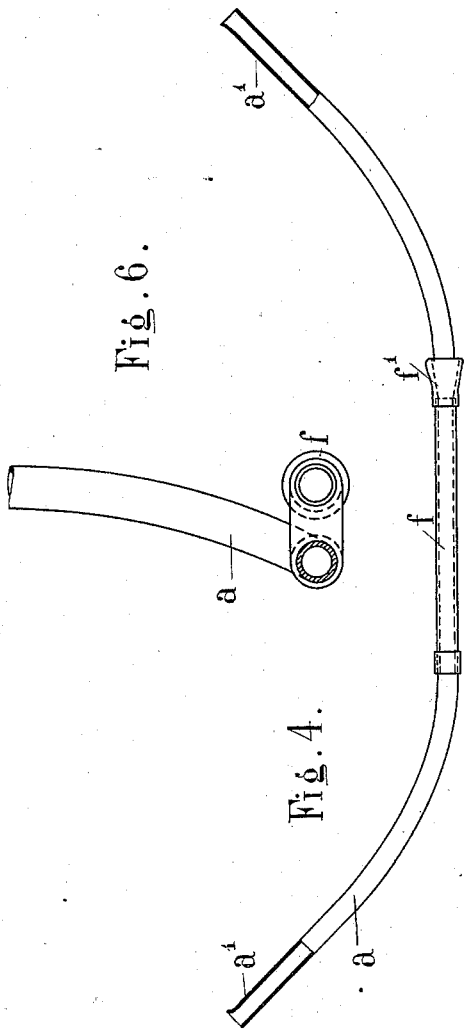
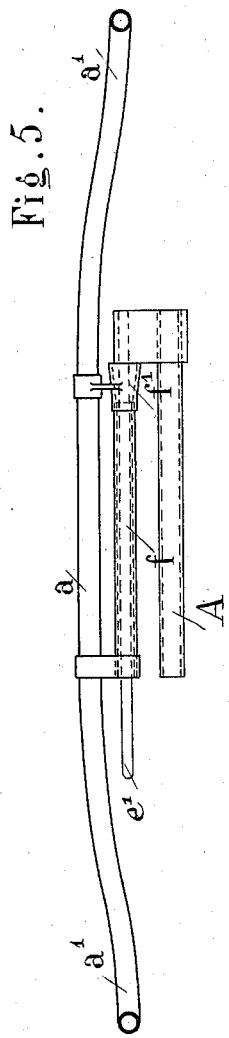

(No Model.) 5 Sheets—Sheet 3.
C. G. P. DE LAVAL.
DEVICE FOR SUSPENDING MECHANICAL MILKING APPARATUS
UPON COWS.
No. 544,813. Patented Aug. 20, 1895.
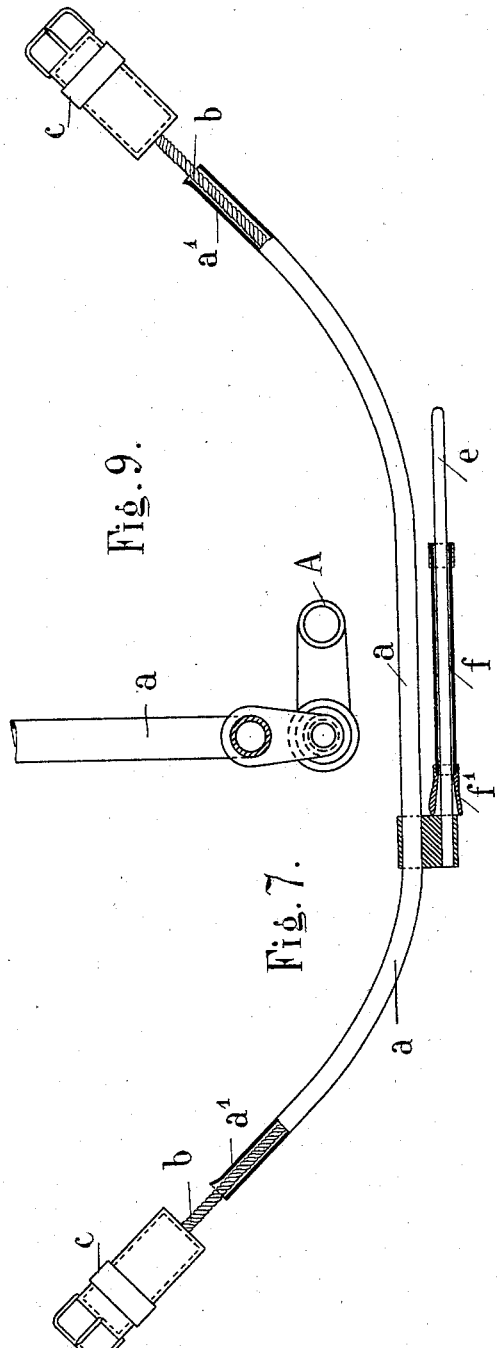
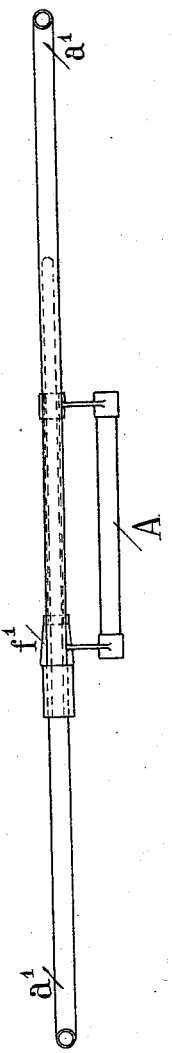

(No Model.) 5 Sheets—Sheet 4.
C. G. P. DE LAVAL.
DEVICE FOR SUSPENDING MECHANICAL MILKING APPARATUS UPON COWS.
No. 544,813. Patented Aug. 20, 1895.
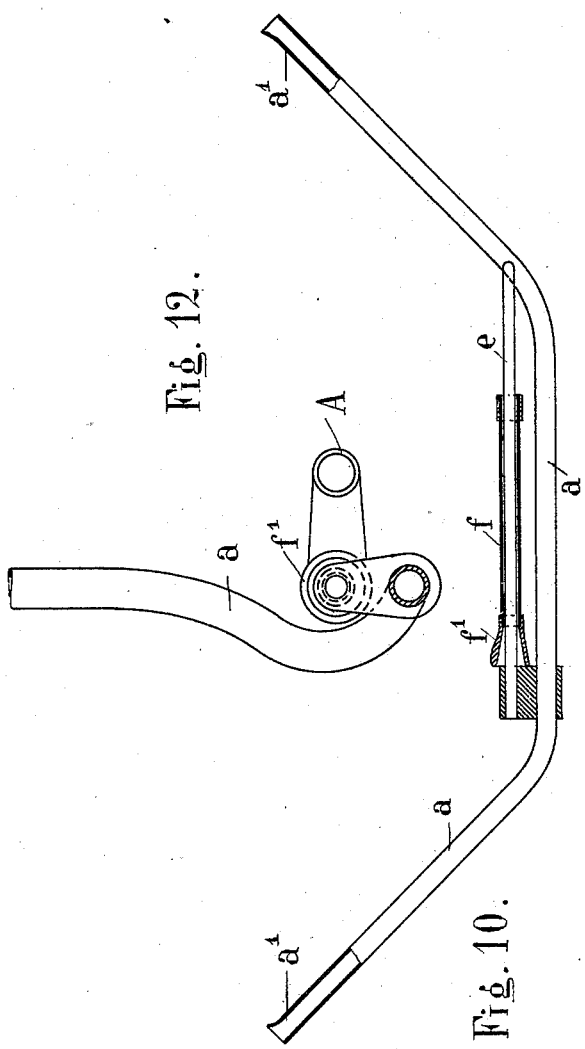
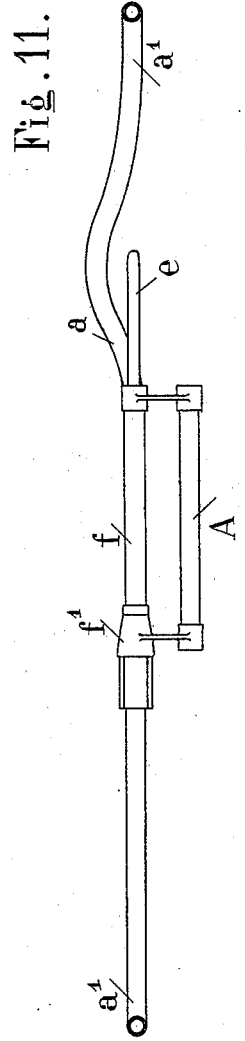

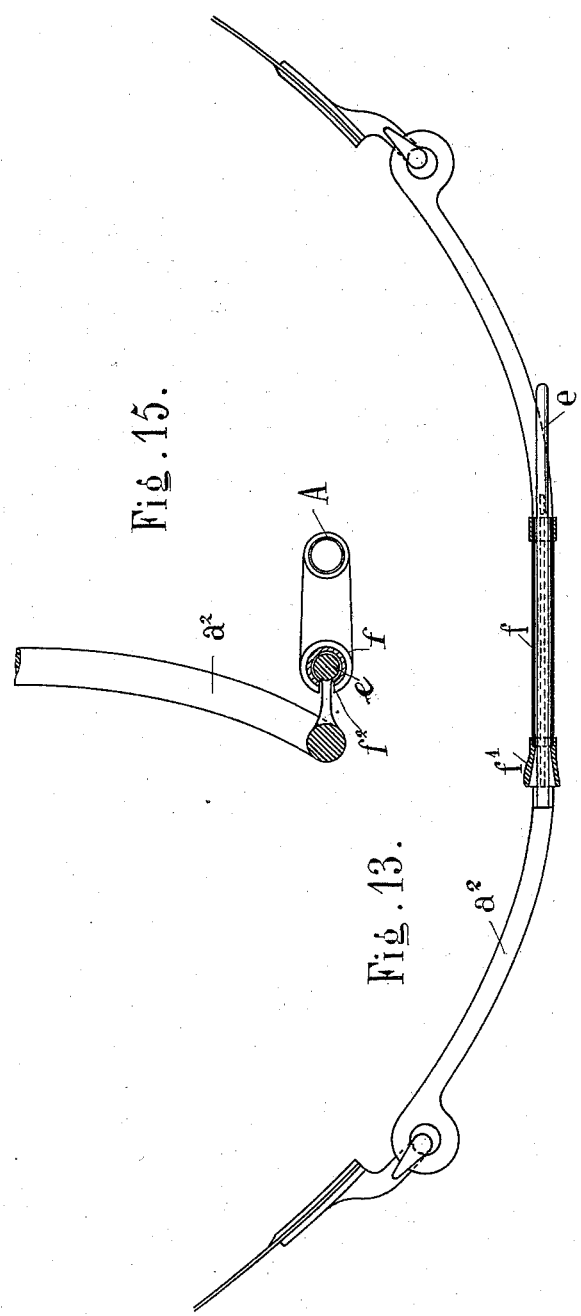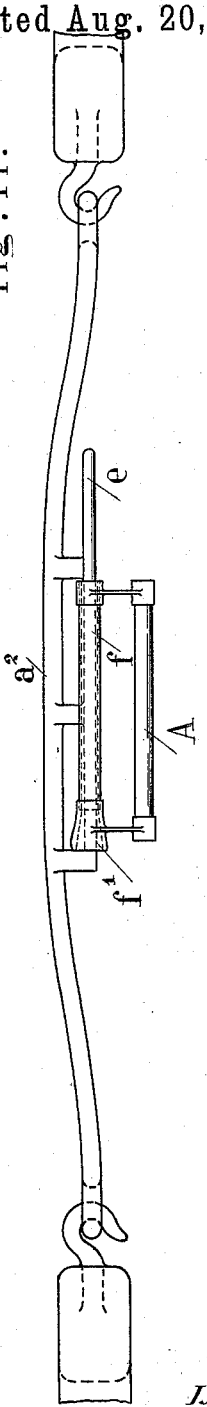

UNITED STATES PATENT OFFICE.

CARL GUSTAF PATRIK DE LAVAL, OF STOCKHOLM, SWEDEN.

DEVICE FOR SUSPENDING MECHANICAL MILKING APPARATUS UPON COWS.

SPECIFICATION forming part of Letters Patent No. 544,813, dated August 20, 1895.

Application filed January 30, 1895. Serial No. 536,697. (No model.)

*To all whom it may concern:*

Be it known that I, CARL GUSTAF PATRIK DE LAVAL, doctor of philosophy and engineer, a citizen of Sweden, residing at 16$^A$ Handtverkaregatan, Stockholm, Sweden, have invented certain new and useful Improvements in Means for Suspending Mechanical Milking Apparatus, of which the following is a specification.

This invention relates to an improved device for suspending a mechanical milking apparatus upon the cow in such a manner that the apparatus with a single grasp is brought into its right position for use. For this purpose a saddle girth or belt is arranged around the body of the cow and to this girth a suspensory attachment having a horizontal guide of some suitable form and nature is attached in a suitable manner, upon which guide the milking apparatus is hung, so that it comes in its proper position. This guide forms a path, upon which the milking apparatus can slide, and it can be arranged in different ways, of which some will be named hereinafter.

In the accompanying drawings, Figures 1 and 2 show in side view, partly in section and in plan, respectively, a construction according to my invention. Fig. 3 shows a milking apparatus as suspended on a cow, the suspending devices being shown in section on line 3 3, Fig. 2. Figs. 4 to 15, inclusive, illustrate various modifications of the invention which may be resorted to without departing from the spirit thereof.

Similar letters of reference indicate corresponding parts.

The arrangement shown in Figs. 1 to 3, inclusive, consists in a tube or sleeve $a$, through which a cord $b$ or the like is passed in such a way that the tube can be moved upon the cord. The ends of the cord are provided with means—for instance, buckles $c$—for attaching it to a saddle-girth, which is passed around the body of the cow. The tube $a$, cord $b$, and buckles $c$ form what may be termed the "suspensory attachment." The tube or sleeve $a$ is straight at its middle part and supports a rod $e$, which extends laterally from the tube and runs parallel with it. The milking apparatus is provided with a sleeve $f$, which is inserted on said rod $e$, and the free end of which extends forward beyond the straight middle portion of the tube, which has end portions $a'$ $a'$ bent according to the contour of the belly of the cow. This said sleeve may, as shown in the drawings, be provided with an enlarged mouthpiece $f'$, in order to facilitate the insertion of the sleeve on the rod $e$. In order to prevent the apparatus suspended in this manner from turning the tube $a$, (the apparatus being suspended laterally to the middle part of the tube,) the ends $a'$ $a'$ of the tube $a$ are bent forward in such a way that the center line of said ends of the tube lies in a vertical plane through the center line of the rod. Fig. 2 shows this clearly. The cord $b$ is passed loosely through the tube $a$, thus enabling the tube to be moved on the cord. When using this suspensory arrangement, the saddle-girth, fixed at $c$ $c$, is applied to the cow and then the milking apparatus is supported on the rod $e$ by means of the sleeve $f$.

Many modifications of the invention may be made. Thus in Figs. 4, 5, and 6 the guide or path, fitted upon the tube $a$, consists of a sleeve $f$ with flaring enlargement $f'$ at the outer end, and the milking apparatus A is provided with a rod or pin $e'$ formed like $e$ in Figs. 1 to 3. In Figs. 7, 8, and 9 is shown a modification, in which the guide or path is arranged beneath the straight part of the tube $a$. In this case the ends of the tube are not bent forward as in Figs. 1 and 2. In Figs. 10, 11, and 12 the guide or path is arranged above the straight part of the tube $a$. In this case the tube must be bent, as shown in Figs. 11 and 12, for enabling the insertion of the milking apparatus A on the pin $e$. In Figs. 13, 14, and 15 the tube is displaced by a rod $a^2$, which is hooked to the girth. The guide or pin $e$ is here attached to said rod $a$ at three places, as indicated in Fig. 13. The sleeve $f$ is slotted at $f^2$, as shown in Fig. 15, (which is an enlarged cross-section,) for enabling the insertion upon the rod $e$.

The modification shown and described may be enough for making evident the different ways in which the invention may be varied without departing from the essential part thereof.

Having thus described my invention, I claim as new and desire to secure by Letters Patent—

1. In means for suspending milking-apparatus on the cow, the combination of a girth, a suspensory attachment adapted to be applied below the body of the cow to the girth around the body of the cow, a horizontal guide or path, attached to said suspensory attachment and extending substantially parallel therewith, and a sliding part attached on the frame of the milking-apparatus and received by said guide, substantially as set forth.

2. In means for suspending milking-apparatus on the cow, the combination of a girth, a suspensory attachment adapted to be applied below the body of the cow to the girth around the body of the cow, a horizontal rod forming a guide attached to and extending substantially parallel with said suspensory attachment, and a sleeve attached on the frame of the milking-apparatus and received by said guide-rod, substantially as set forth.

3. In means for suspending milking-apparatus on the cow, the combination of a girth, a suspensory attachment to be applied to the girth around the body of the cow and consisting of a tube, and a cord passing through the tube, a rod fixed to and extending parallel with said tube and with its free end reaching forward beyond the middle part of said tube, and a sleeve attached on the frame of the milking-apparatus and received by said guide-rod, substantially as set forth.

4. In means for suspending milking-apparatus on the cow, the combination of a girth, a tube, the end parts of which are bent according to the belly of the cow, a cord passing through the tube and adapted to be attached to the girth applied around the body of the cow, and a horizontal rod, extending laterally from said tube and running parallel with it, the ends of the said tube being bent forward so that their center-line falls in a vertical plane through the center line of the rod, substantially as set forth.

In testimony that I claim the foregoing as my invention I have signed my name in presence of two subscribing witnesses.

CARL GUSTAF PATRIK DE LAVAL.

Witnesses:
TYEKO ROBSAHM,
WALDEMAR BOMAN.